United States Patent [19]

Arad

[11] Patent Number: 5,103,224
[45] Date of Patent: Apr. 7, 1992

[54] AIRCRAFT TAKEOFF MONITORING SYSTEM

[76] Inventor: Ady Arad, P.O. Box 6408, FDR Station, New York, N.Y. 10150

[21] Appl. No.: 480,963

[22] Filed: Feb. 16, 1990

[51] Int. Cl.$^5$ .............................................. G08B 21/00
[52] U.S. Cl. ................................... 340/959; 73/178 T; 364/427
[58] Field of Search .............. 340/959, 963, 945; 73/178 T; 364/427, 424.06; 244/191

[56] References Cited

U.S. PATENT DOCUMENTS

| | | |
|---|---|---|
| 3,034,096 | 5/1962 | Craddock . |
| 3,048,329 | 8/1962 | Berggren ................... 73/178 T |
| 3,077,110 | 2/1963 | Gold ........................... 340/959 |
| 3,128,445 | 4/1964 | Hosford . |
| 3,159,738 | 12/1964 | James et al. ............... 364/427 |
| 3,174,710 | 3/1965 | Hoekstra ................... 73/178 T |
| 3,241,362 | 3/1966 | Scott .......................... 340/959 |
| 3,691,356 | 9/1972 | Miller . |
| 3,705,306 | 12/1972 | Lydon et al. . |
| 3,752,967 | 8/1973 | Vietor . |
| 3,868,497 | 2/1975 | Vietor . |
| 4,021,010 | 5/1977 | Bliss . |
| 4,040,005 | 8/1977 | Melvin . |
| 4,106,731 | 8/1978 | Bliss . |
| 4,122,522 | 10/1978 | Smith . |
| 4,133,503 | 1/1979 | Bliss . |
| 4,149,148 | 4/1979 | Miller . |
| 4,212,064 | 7/1980 | Forsythe et al. . |
| 4,247,843 | 1/1981 | Miller et al. . |
| 4,251,868 | 2/1981 | Aron et al. ................. 340/959 |
| 4,312,041 | 1/1982 | DeJonge . |
| 4,454,582 | 6/1984 | Cleary et al. . |
| 4,530,060 | 7/1985 | Greene . |
| 4,594,592 | 6/1986 | Greene . |
| 4,608,863 | 9/1986 | Cooper . |
| 4,638,437 | 1/1987 | Cleary et al. ............... 340/959 |
| 4,764,872 | 8/1988 | Miller . |
| 4,773,015 | 9/1988 | Leland et al. ............... 864/427 |
| 4,792,906 | 1/1988 | King et al. . |
| 4,843,554 | 6/1989 | Middleton et al. .......... 73/178 T |

FOREIGN PATENT DOCUMENTS 1327031 8/1973 United Kingdom .............. 73/178 T

Primary Examiner—Jin F. Ng
Assistant Examiner—Brent A. Swarthout
Attorney, Agent, or Firm—Dickinson, Wright, Moon, Van Dusen & Freeman

[57] ABSTRACT

The displays are provided for assisting a pilot in making critical decisions during the takeoff roll of the aircraft. The first of the displays includes four pointers which indicate, respectively, the maximum available acceleration of the aircraft, the minimum acceleration required to achieve a velocity $V_2$ at 35 feet above the end of the runway with all engines operating, the minimum required acceleration which will allow the aircraft to accelerate to a critical velocity with all engines operating and complete a legal takeoff after loss of an engine at the critical velocity ($V_1$), and the actual acceleration of the aircraft. The second display indicates the ability of the aircraft to safely complete the takeoff if an engine were to fail and the ability of the aircraft to stop safely if the pilot were to decide to abort the takeoff. The second display includes first and second sets of colored lights indicating clearly safe and unsafe conditions and a marginally safe condition for the continued takeoff and abort situations. The displays are driven by a microprocessor which is supplied with both specific and generalized data for the aircraft such that the variety of factors to be displayed can be calculated.

17 Claims, 1 Drawing Sheet

AIRCRAFT TAKEOFF MONITORING SYSTEM

TECHNICAL FIELD

This invention relates to a display for a pilot of an aircraft to assist in making decisions during takeoff.

BACKGROUND ART

During the takeoff roll of an aircraft, the pilot is required to make several decisions in a very short time period. Perhaps the most important decision, which must be made continuously during takeoff, is whether to continue the takeoff or to abort. This decision depends on several factors which are considered by the pilot in a variety of ways, and great reliance is placed on the experience of the pilot. There are, however, several known systems which propose to assist the pilot by providing a display of information about the aircraft.

Another decision which must be made by the pilot is the amount of thrust (power) to be applied during the takeoff roll. It is not economical merely to apply full thrust, because of the wear on the engines, and the proportion of the thrust which is to be applied is a function of the characteristics of the aircraft and of the runway.

U.S. Pat. No. 4,773,015 (Leland) teaches an aircraft takeoff monitor which measures the actual distance travelled during the takeoff roll and compares this to an expected distance. The expected distance is calculated by an onboard computer based on stored values for the particular aircraft and variables which have been supplied to the computer by the crew. The display comprises two sets of lights which indicate the runway distance which the aircraft has travelled and the distance required to stop. A first of the displays shows the difference between the actual distance travelled and the expected distance. The second of the displays shows the difference between the distance from the end of the runway in which the aircraft can come to a stop and 1000 feet from the end of the runway.

A system recently developed by NASA has been described in the Nov. 3, 1989, issue of Aviation Week & Space Technology. According to this system, a display shows diagrams of the runway and the aircraft on the runway. The position of the diagram of the aircraft represents the actual position of the aircraft on the runway, and other indicia represent the velocity of the aircraft and the expected location of the aircraft when it attains a velocity $V_1$.

SUMMARY OF THE INVENTION

In accordance with the invention, two displays are provided to the pilot to assist in deciding whether to continue the takeoff or to abort. These displays provide information which has either been calculated from measured or supplied parameters or information which has been provided directly.

A first display includes four pointers, the relative positions of which indicate to the pilot critical aspects of the aircraft which are important during takeoff.

A first pointer represents the maximum available acceleration (MAA) of the aircraft. This maximum available acceleration is calculated by supplying such known factors as weight, velocity, temperature, and pressure altitude to a microprocessor which has been supplied with a relationship provide by the manufacturer of the aircraft for determining the available acceleration. This factor will also be a function of the number of engines available and their configuration, and the microprocessor is programmed to account for this so that the available acceleration can be determined for all expected events, which includes the failure of an engine.

A second pointer (AA) represents the actual acceleration experienced by the aircraft, and this can be calculated in a variety of ways. For example, the change in velocity of the aircraft as a function of time can be measured, or the acceleration can be determined by an inertial navigation system (INS), an IRS, or an accelerometer.

A third pointer (MRA-OEI) represents the minimum required acceleration to reach a required real time velocity $V_1$ at the required real time distance along the runway assuming that at this point the aircraft will experience the failure of one engine but will continue the take off with the remaining engines to achieve a velocity $V_2$ at an altitude of 35 feet above the end of the runway.

A fourth pointer (MRA-AEO) represents the minimum required acceleration with all engines operative to enable the aircraft to reach a required real time velocity at a required real time distance along the runway and to achieve an altitude of 35 feet above the end of the runway at a velocity $V_2$.

The relative positions of these four pointers gives the pilot an immediate indication of the status of the aircraft and assists in determining whether power should be added or whether the takeoff should be aborted. For example, if the minimum required acceleration with all engines operative (MRA-AEO) becomes greater than the actual acceleration (AA), the MRA-AEO pointer will move upward on the display with respect to the AA pointer which will signal the pilot that an event has occurred which has affected either the required or actual accelerations, or both. One cause for reduction in the actual acceleration could be a loss of power, which can be ascertained (or confirmed) from other instruments in the cockpit. In response to this indication, the pilot can increase the power supplied by the engines, the adequacy of which will be indicated by achieving coincidence of the MRA-AEO and AA pointers. Another cause for change in the required acceleration is a change in the wind component which calls for a new $V_1$ at a new position on the runway.

It will be appreciated that the position at which the aircraft must reach $V_1$ is a function of the runway length and the available acceleration from $V_1$ to rotation velocity (V,) and then to a velocity $V_2$ at an altitude of 35 feet above the end of the runway, assuming one engine inoperative at $V_1$.

The first display predicts the ability of the aircraft to make a legal takeoff assuming an engine were to fail at V: If the MRA-OEI indicator is above the AA pointer, the pilot will know that the aircraft will not be able to complete a legal takeoff if a engine fails at $V_1$, and the pilot will either increase the power or abort the takeoff.

A second display is a prescriptive decision making module which indicates the action which should be taken by the pilot at the instant at which an engine failure occurs. It is preferably used in conjunction with the first display and provides the pilot with information about the ability of the aircraft to reach the end of the runway at a velocity $V_2$ at an altitude of 35 feet with an engine failure, and the ability of the aircraft to stop on the runway, or an allowed overrun, if the takeoff were aborted.

This second display includes three colored lights (e.g., red, yellow, and green) on an upper part and three colored lights on a lower part of the display. The upper lights advise the pilot of the ability of the aircraft to reach $V_2$ at 35 feet if an engine were to fail at this point, the green light indicating that continuing the takeoff run would be safe, the yellow light indicating that continuing the takeoff would not be advised but possible, and the red light indicating that continuing the takeoff would be unsafe. The lower lights advise the pilot of the ability of the aircraft to stop safely if an engine failure occurs. The pilot can determine the proper course of action by consideration of the indications provided by these lights.

Use of the displays according to the invention allows the pilot to predict the performance of the aircraft much better and to operate it more safely than with prior art instruments. This means that the aircraft can be operated more reliably close to its safety limits, which allows the aircraft so equipped to be utilized to its economic maximum.

DETAILED DESCRIPTION OF THE PREFERRED EMBODIMENT

Figure 1A:
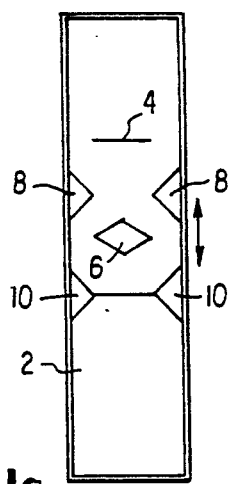
FIG. 1a is a schematic of a first display showing a condition where the actual acceleration is less than the MRA-OEI.

With reference to FIG. 1a, a display panel 2 is provided in the cockpit of an aircraft in a location easily viewed by the pilot. The panel 2 receives electronic signals form a computer which will be described in more detail with respect to FIG. 3.

The panel 2 provides four indications regarding the acceleration of the aircraft to assist the pilot in making decisions during takeoff. A first indicator 4 indicates the maximum available acceleration (MAA). This indicator is represented as a line on the face of the display, but may be any of a variety of indicators. The position of the MAA indicator 4 is a function of the characteristics of the aircraft model in general and of the characteristics of that particular aircraft, such as its weight, and the atmospheric conditions. This value is calculated from information provided by the manufacturer of the aircraft and calculated values as will be more fully described with respect to FIG. 4.

A second indicator 6, shown in preferable diamond shape, is movable along the display in the directions shown by the adjacent double headed arrow. This indicator shows the actual acceleration (AA) of the aircraft, which is a function of several factors, such as the percentage power output of the engines.

A third indicator 8 also moves along the display in the direction in a manner similar to indicator 6. This third indicator shows the minimum required acceleration (MRA-OEI) for achieving a velocity $V_1$ at a location on the runway such that the aircraft would be capable of achieving an altitude of 35 feet above the end of the runway at a velocity $V_2$ if an engine were to fail at $V_1$.

A fourth indicator 10 is depicted as two triangles connected by a line and represents the minimum required acceleration (MRA-AEO) to reach the end of the runway at a velocity $V_2$ and an altitude of 35 feet assuming that all engines are operative throughout the takeoff.

The display 2 is preferably used by the pilot as an instrument to assist the pilot in making decisions regarding the amount of power to be applied during the takeoff roll and to predict what the situation will be if an engine is lost at $V_1$. This will help the pilot decide whether to abort the takeoff if an engine is lost.

The display shown in FIG. 1a illustrates the condition wherein the actual acceleration (AA) of the aircraft is not enough to reach the velocity $V_1$ at the required distance along the runway but is adequate to make a safe takeoff if all of the engines are operative. Thus, the AA pointer 6, which represents the actual acceleration of the aircraft, is above the MRA-AEO pointer 10. The MRA-OEI pointer 8, which represents the predicted ability of the aircraft to make a takeoff within the set legal limits after losing an engine at $V_1$, is above the AA pointer, however, which indicates that a legal takeoff will not be possible if an engine is lost at $V_1$. Given this condition, the pilot would most likely make the decision to increase the power supplied by the aircraft's engines. This would cause the AA indicator 6 to move upward as the aircraft begins to accelerate faster.

Figure 1B:
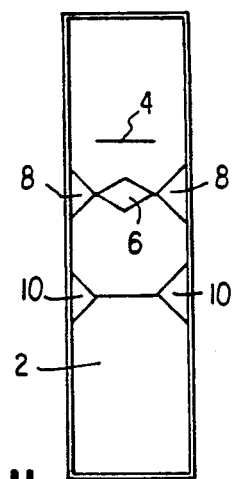
FIG. 1b is a schematic of the display shown in FIG. 1 showing the effect of corrective actions taken by the pilot.

A corrected condition is shown in FIG. 1b wherein the AA indicator 6 is aligned with the MRA-OEI indicator 8. In this condition, the two indicators will remain aligned unless an event occurs which affects the actual acceleration.

In the condition of the aircraft illustrated in FIG. 1a, the MRA-OE indicator 8 would be moving upward because of the fact that the minimum required acceleration to reach $V_1$ at a certain distance along the runway increases if the actual acceleration is too low. The positions of the indicators 6, 8, and 10 are controlled by the results of calculations constantly being made by the onboard computer and transmitted to the display 2. Thus, the display is constantly updated with new information.

Figure 2:
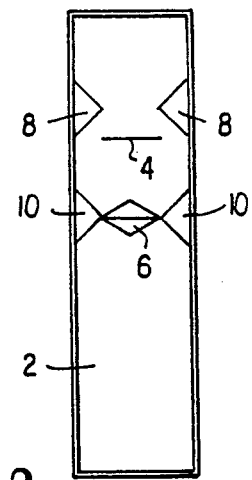
FIG. 2 is a schematic of the display shown in FIG. 1a where the available acceleration is less than the MRA-OEI.

Another condition of the aircraft is shown in FIG. 2 and represents a potentially dangerous condition which could be interpreted by a pilot as a indication that the takeoff should be aborted if there is adequate stopping distance. In this condition, the minimum required acceleration to complete a takeoff, as indicated by indicator 10 is equal to the actual acceleration as indicated by indicator 6, but the minimum acceleration required to accelerate to $V_1$ and complete a safe takeoff if an engine were to fail at $V_1$, as indicated by the MRA-OEI indicator 8 has moved to a location above the MAA indicator 4, which means that the aircraft is not capable of providing the acceleration adequate to make a safe takeoff if an engine were to fail at $V_1$.

Figure 3A:
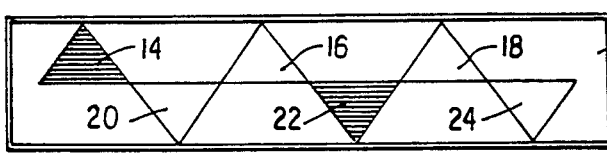
FIG. 3a is a schematic of a second display which indicates that the aircraft cannot takeoff safely if an engine failure occurs at this moment and can only marginally stop within a prescribed distance.
Figure 3B:
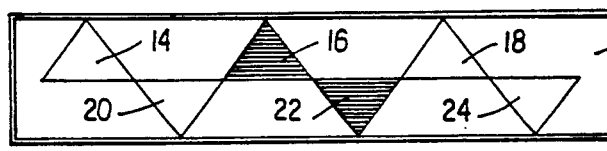
FIG. 3b is a schematic of the display shown in FIG. 3a wherein the ability of the aircraft to takeoff safely if an engine failure occurs at this moment or to stop safely is marginal.
Figure 3C:
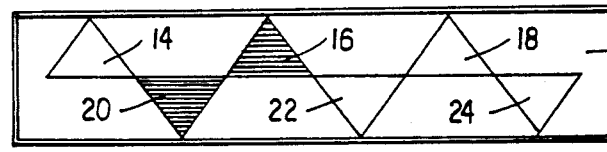
FIG. 3c is a schematic of the display shown in FIG. 3a wherein the ability of the aircraft to takeoff if an engine failure occurs at this moment is marginal, and the ability to stop safely is not satisfactory.

FIGS. 3a–3c illustrate a second display 12 which will provide a pilot with additional information regarding the takeoff roll and the ability of the aircraft to safely stop in the available distance. This display includes two sets of three lights. A first set comprises lights 14, 16, and 18 which are respectively red, yellow and green and indicate the ability of the aircraft to make a legal takeoff if an engine failure occurs. The second set comprises lights 20, 22, and 24, which are also respectively red, yellow and green and indicate the ability of the aircraft to stop safely.

FIG. 3a shows the display 12 when the aircraft is in the condition where it is unsafe to continue the takeoff if an engine fails at this moment as indicated by the red light 14 and marginally safe to stop as indicated by the yellow light 22. If the aircraft were to lose an engine when in this situation, the pilot would make the decision to abort the takeoff FIG. 3b shows the condition wherein the ability of the aircraft to takeoff or to stop is marginal as indicated by the yellow lights 16 and 22. If the aircraft were to lose an engine when in this situation, the pilot would decide whether to abort or to continue the takeoff because the risk is about equal for either course of action.

FIG. 3c shows the condition wherein the ability of the aircraft to takeoff safely is marginal as indicated by the yellow light 16 and the aircraft cannot stop safely as indicated by the red light 20. If the aircraft were to lose an engine when in this situation, the pilot would continue the takeoff, because to abort would subject the aircraft to an unsafe stop.

The preferred supply of signals to the displays 2 and 12 will now be described.

The position of the maximum available acceleration is a function of a variety of factors, such as the aircraft type, its weight, and atmospheric conditions. Mathematical functions which define these relationships are supplied by the manufacturer, and it is only necessary to provide these relationships and the necessary raw data to microprocessor 26 to obtain a signal to control the position of indicator 4.

The actual acceleration of the aircraft can be obtained in a variety of ways. For example, it can be obtained directly from the inertial navigation system or any kind of accelerometer, or it can be calculated from known relationships of time and distance.

An understanding of the calculations necessary to determine the various values can be obtained from the following analysis, it being understood that other formulations may be used to obtain these values.

Figure 5:
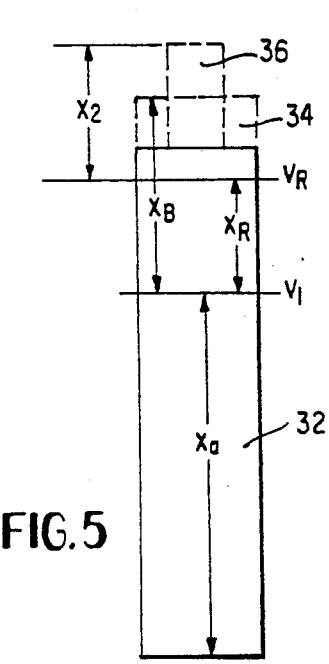
FIG. 5 is a schematic diagram of a runway showing relevant distances and velocities.

With reference to FIG. 5, a runway 32 is schematically illustrated. A stop way 34, which provides additional stopping distance, and a clearway 36, which provides additional distance to achieve $V_2$ at an altitude of 35 feet, are at the end of the runway. Variables which may be required to make the necessary calculations may be defined as:

$X_a$ = the real time distance from the present position of the aircraft to $V_1$;

$X_8$ = the distance allowed for braking if the takeoff is aborted at $V_1$;

$X_R$ = the distance between the point at which the aircraft achieves $V_1$ and $V_r$;

$V_r$ = the velocity at which the aircraft is rotated to increase the angle of attack of the wings to reach $V_2$ at 35 feet above the end of the runway;

$V_t$ = the instantaneous velocity of the aircraft;

$X_2$ = the distance between the point at which the aircraft reaches $V_r$ and the point at which the aircraft is required to have achieved an altitude of 35 feet at a velocity $V_2$;

S.W. = the length of the stopway 34;

C.W. = the length of the clearway 36;

R.W. = the length of the runway;

$A_R$ = the acceleration from $V_{hd1}$ to $V_R$ with one engine inoperative;

$A_2$ = the acceleration from $V_R$ to $V_2$ at an altitude of 35 feet with one engine inoperative (note that this is less than $A_R$ because of the increased drag);

m = the takeoff mass of the aircraft;

$F_B$ = the braking force which will be applied if the takeoff is aborted;

$A_a$ = the average acceleration from $V_t$ to $V_1$.

These factors are related in a variety of ways in accordance with the basic laws of mechanics. For example, the MRA-OEI is a function of such factors as: (1) $X_a$, (2) the acceleration of the aircraft with one engine inoperative, which can be calculated from the tables supplied by the manufacturer and the data particular to that aircraft (e.g. weight), and (3) $X_R + X_2$. The MRA-AEO is a function of similar variables, except that the relevant acceleration is that which is obtained with all engines operating. The distance $X_a$ is a function of such factors as: (1) $V_1$, (2) the mass (m) of the aircraft, (3) $F_B$, and (4) the total length available for acceleration and stopping (R.W. + S.W.). Velocity $V_1$ is a function of such factors as: (1) F, (2) $A_R$, (3) $X_2$, (4) $V_R$, (5) m, (6) S.W. and (7) C.W. Other relationships will be apparent to those of skill in the art which will allow the calculation of the factors necessary to display the relevant required and actual accelerations and to make the decisions for the display 12.

The display 12 is preferably operated by use of decisional criteria which rely upon calculations such as those discussed above. For example, the yellow light 16, which indicates that the aircraft will only marginally be able to complete a safe takeoff if an engine were to fail, is activated if the calculated altitude above the end of the runway at a velocity of $V_2$ is between 10 and above. For example, the yellow light 16, which indicates that the 35 feet. The green light 18 will be activated if that altitude is 35 feet or greater, and the red light will be illuminated if the altitude is less than 10 feet. The green braking light 24 will be illuminated if the difference between the available stopping distance and the required stopping distance is greater than 1000 feet. The yellow light will be illuminated if this difference is between zero and 1000 feet, and the red light will be illuminated if this difference is less than zero.

Figure 4:
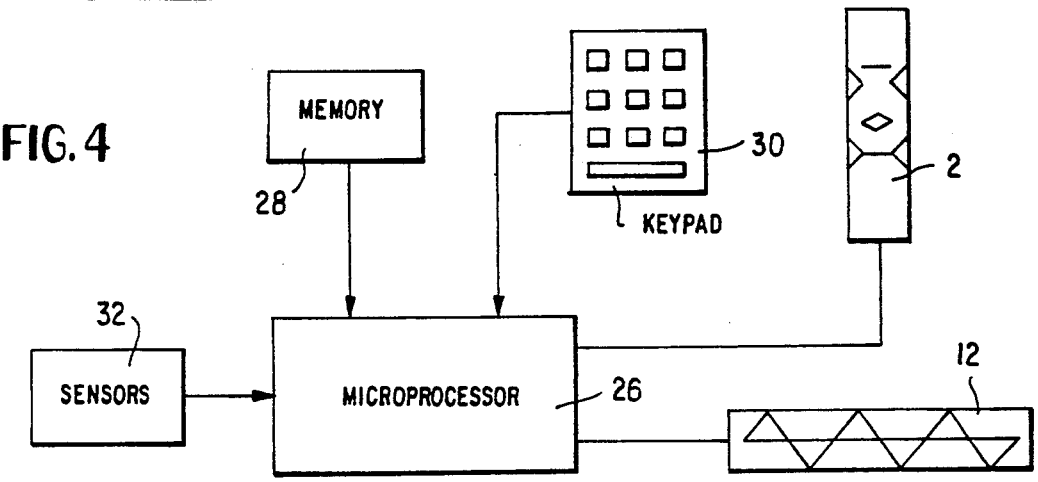
FIG. 4 is a schematic diagram of an onboard computer for supplying the displays of FIGS. 1 through 3 with signals and for receiving input data regarding the particular aircraft.

FIG. 4 is a schematic diagram of a system which will allow the calculation of the factors noted above and the supply of signals representing these factors to the displays 2 and 12. A microprocessor 26 is supplied with fixed, known factors and formulas by memory 28; data regarding variables such as weight, temperature, and atmospheric pressure are supplied by sensors 32 and other factors which must be manually entered, such as the particular runway length, are supplied by keypad 30. The microprocessor makes the necessary calculations as discussed above and supplies output signals to displays 2 and 12 in a manner known in the art.

It will be appreciated that a unique system for assisting a pilot in making decisions during takeoff has been described. Modifications within the scope of the appended claims will be apparent to those of skill in the art.

I claim:

1. Apparatus for assisting a pilot of an aircraft during a takeoff roll on a runway comprising a display panel, maximum available acceleration indicator means (4) on said panel representing the maximum available acceleration of the aircraft, actual acceleration indicator means (6) on said panel for continuously indicating the real-time, actual acceleration of the aircraft, first minimum required acceleration indicator means (10) on said panel for continuously indicating the real-time minimum acceleration of the aircraft required to reach a critical velocity at a real time position on the runway, means for continuously determining the real time position on the runway, said real time position on the runway being continuously subject to change depending on changing conditions during the takeoff roll, and second minimum required acceleration indicator means (8) or continuously indicating the real-time minimum acceleration required to reach said critical velocity with all engines of the aircraft operating, to lose an engine at said critical velocity, and to complete a legal takeoff with said one engine inoperative.

2. Apparatus according to claim 1 wherein said maximum available acceleration indicator is fixed with respect to said panel and said actual acceleration indicator and said first and second minimum required acceleration indicators are moveable with respect to said panel.

3. Apparatus according to claim 2 in combination with a second display panel for indicating the ability of the aircraft to complete a safe takeoff after failure of an engine.

4. Apparatus according to claim 3 wherein said second display panel also indicates the ability of the aircraft to stop safely is the takeoff is aborted.

5. Apparatus according to claim 4 wherein said second display panel comprises first and second sets of colored lights, said first set indicating said ability of the aircraft to complete a safe takeoff after failure of an engine, and said second set indicating said ability of the aircraft to stop safely if the takeoff is aborted.

6. A display for assisting a pilot during takeoff of an aircraft comprising means for continuously determining and indicating the real time, actual acceleration of said aircraft during said takeoff, means for continuously determining and indicating the minimum acceleration required for said aircraft to reach a predetermined velocity at a real time location along the runway, and means for continuously determining the real time location along the runway, said real time location along the runway being continuously subject to change depending on changing conditions during the takeoff.

7. A display according to claim 6 wherein said means for indicating the minimum acceleration required indicates the acceleration required to reach a velocity $V_2$ at a predetermined altitude above the end of the runway after loss of an engine at a velocity $V_1$.

8. Apparatus according to claim 6 further comprising means for continuously determining and indicating the minimum acceleration required for said aircraft to reach a predetermined altitude above the end of the runway if all engines of said aircraft remain operation.

9. Apparatus according to claim 7 wherein said predetermined altitude is 35 feet.

10. Apparatus according to claim 8 wherein said predetermined altitude is 35 feet.

11. Apparatus according to claim 1 in combination with a first indicator means for continuously determining and indicating whether said aircraft can attain a predetermined altitude at a predetermined location if an engine were to fail at the moment and second indicator means adjacent said first indicator means for indicating whether said aircraft is capable of stopping within a predetermined distance of the end of the runway if the takeoff were aborted at that moment.

12. Apparatus according to claim 11 wherein said first and second indicator means comprise respective first and second sets of colored lights.

13. Apparatus according to claim 12 wherein each of said first and second sets of colored lights comprises a red, a yellow, and a green light.

14. Apparatus according to claim 11 wherein said first indicator means comprises a first register indicating whether the aircraft is capable of achieving a first predetermined altitude over the end of the runway if an engine were to fail, and a second register indicating whether the aircraft is capable of achieving a second predetermined altitude over the end of the runway if an engine were to fail.

15. Apparatus according to claim 14 wherein said second indicator means comprises a third register indicating whether said aircraft is capable of stopping within a predetermined distance of the end of the runway if the takeoff were aborted.

16. A method for determining whether a safe takeoff is possible in an aircraft with respect to a takeoff path, comprising continuously determining the actual, real time acceleration of said aircraft, continuously determining the real time acceleration required for said aircraft to reach a critical velocity at a real time location on said takeoff path, and continuously determining the real time location on said takeoff path, said real time location on said takeoff path being continuously subject to change depending on changing conditions during the takeoff roll, wherein said critical velocity is that velocity at which the aircraft could lose an engine and still be capable of a legal takeoff.

17. A method according to claim 16 further comprising the steps of displaying said actual, real time acceleration of said aircraft, and said real time acceleration required for said aircraft to reach a critical velocity.

* * * * *